United States Patent
Shimura

(10) Patent No.: US 7,377,157 B2
(45) Date of Patent: May 27, 2008

(54) TIRE-SIDE-MOUNTED ELECTRONIC DEVICE

(75) Inventor: Kazuhiro Shimura, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 10/590,107

(22) PCT Filed: Mar. 22, 2005

(86) PCT No.: PCT/JP2005/005102

§ 371 (c)(1),
(2), (4) Date: Aug. 22, 2006

(87) PCT Pub. No.: WO2005/090101

PCT Pub. Date: Sep. 29, 2005

(65) Prior Publication Data

US 2007/0180894 A1    Aug. 9, 2007

(30) Foreign Application Priority Data

Mar. 22, 2004  (JP) .............................. 2004-081802

(51) Int. Cl.
*B60C 23/02* (2006.01)
(52) U.S. Cl. ................................... 73/146.5
(58) Field of Classification Search ............... 73/146
See application file for complete search history.

(56) References Cited

FOREIGN PATENT DOCUMENTS

| JP | 120103 | 7/1982 |
|---|---|---|
| JP | 9-247850 | 9/1997 |
| JP | 9-298806 | 11/1997 |
| JP | 2002-95174 | 3/2002 |
| JP | 2004-281126 | 10/2004 |

*Primary Examiner*—Andre J. Allen
(74) *Attorney, Agent, or Firm*—Greer, Burns, & Crain, Ltd

(57) ABSTRACT

A tire-side-mounted electronic device according to the present invention includes at least two types of power sources having different discharging characteristics from each other. An electric load is connected to the power sources.

10 Claims, 2 Drawing Sheets

TIRE-SIDE-MOUNTED ELECTRONIC DEVICE

TECHNICAL FIELD

The present invention relates to an electronic device mounted on a tire side, such as a tire condition detection device that detects tire air pressure, temperature, etc., and more particularly, to a tire-side-mounted electronic device capable of stably supplying electric power from a power source.

TECHNICAL BACKGROUND

Recently, in order to improve driving safety of a vehicle, there have been proposed technologies that allow a driver to monitor an air pressure, temperature, etc. of a tire detected by a tire condition detection device mounted on a tire side (see patent documents 1, 2 and 3, for example).

An electronic device mounted on a tire side such as a tire condition detection device generally contains a battery as a power source, and an electric load including, for example, sensors such as a pressure sensor and a temperature sensor, and a transmitter that transmits to a vehicle side pressure information, temperature information, etc. from the sensors is driven with the battery.

However, since the power source of the tire-side-mounted electronic device is a single one (power source having consistent discharging characteristics), problems may arise. For example, a chemical battery used for the power source is arranged to produce an electric potential difference between electrodes using a chemical reaction and to supply electric currency to the electric load using the electric potential difference; therefore, the temperature range where the chemical battery can stably act is narrow.

On the other hand, a tire turns into a high temperature state due to heat generated during running, while a tire turns into a low temperature state when a vehicle is parked in a cold region such as a snow district. Accordingly, the battery contained in the tire-side-mounted electronic device may be subjected to a wide-ranging temperature environment from low temperature to high temperature.

Therefore, a chemical battery having a narrow temperature range where it can stably acts may have a case where the electric load can not be driven normally; there is a problem of lacking reliability that electric power is stably supplied from the power source.

Patent Document 1: Japanese patent application Kokai publication No. 2001-250186

Patent Document 2: Japanese patent application Kokai publication No. 2002-331814

Patent Document 3: Japanese patent application Kokai publication No. 2003-182328

DISCLOSURE OF THE INVENTION

An object of the present invention is to provide a tire-side-mounted electronic device that can stably supply electric power from a power source.

In order to achieve the above object, the present invention provides a tire-side-mounted electronic device comprising at least two types of power sources having different discharging characteristics from each other, and an electric load connected to the power sources.

According to the present invention described above, when a problem occurs with one of the power sources having discharging characteristics different from the other of the power sources, electric power can be supplied to the electric load from the other; therefore, electric power can be supplied to the electric load from the power sources more stably than before.

BEST MODES FOR CARRYING OUT THE INVENTION

Embodiments of the present invention will be described in detail below with reference to the attached drawings.

Figure 1:
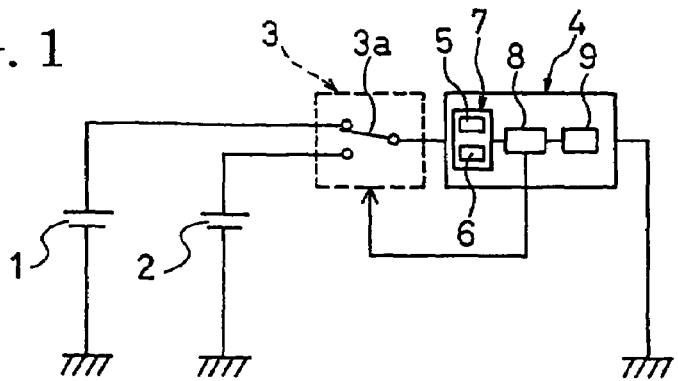
FIG. 1 is an illustration showing a circuit arrangement of an embodiment of a tire-side-mounted electronic device according to the present invention.

Referring to FIG. 1, there is shown an embodiment of a tire-side-mounted electronic device according to the present invention; a tire pressure detection device is shown here as an example of the tire-side-mounted electronic device. It should be noted that the tire-side-mounted electronic device of the present invention includes any electronic device which is mounted on a tire side (including a wheel) and has electronic components driven with a battery contained therein, such as a tire condition detection device that detects a tire condition such as tire air pressure, temperature, etc.

The tire-side-mounted electronic device of FIG. 1 has power sources 1 and 2 comprising two types of chemical batteries having different temperature-dependant discharging characteristics. The power sources 1 and 2, which are connected to each other in parallel, are electrically connected via a switching circuit 3 to an electric load 4 in series.

The electric load 4 includes a sensor unit 7 having a pressure sensor 5 for detecting an air pressure of a tire and a temperature sensor 6 for detecting a temperature within the cavity of the tire, a processor unit (CPU) 8 that corrects detected values of a pressure signal input from the pressure sensor 5 using detected values of a temperature signal input from the temperature sensor 6, and a transmitting unit 9 that transmits to a vehicle side the pressure signal corrected in the processor unit 9.

The processor unit 8 is also designed to output a signal for switching the switching circuit 3 when the detected values of the temperature signal input from the temperature sensor 6 exceed a preset temperature threshold level (45.degree. C., for example).

The power sources 1 and 2, switching circuit 3 and electric load 4 are placed in a casing (not shown), which is designed to be mounted on an inner surface of a tire, a rim or the like.

Figure 2:
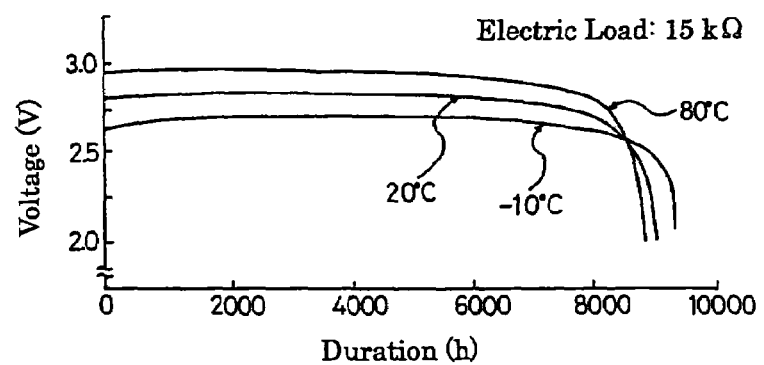
FIG. 2 is a graph showing the discharging characteristics of a manganese dioxide cell, where the voltage (V) is plotted along the ordinate and the duration (hour) along the abscissa.

As shown in FIG. 2, a manganese dioxide cell (a usable temperature upper limit of 80.degree. C.) that stably acts in a low temperature region is preferably mentioned as the chemical battery used for the power source 1.

Figure 3:
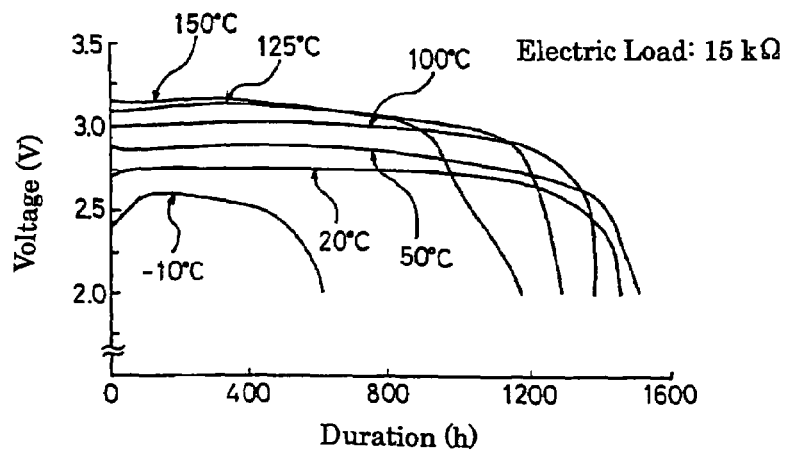
FIG. 3 is a graph showing the discharging characteristics of a graphite fluoride cell, where the voltage (V) is plotted along the ordinate and the duration (hour) along the abscissa.

As shown in FIG. 3, a graphite fluoride cell (a usable temperature upper limit of 125.degree. C.) that stably acts in a high temperature region is preferably used for the chemical battery employed for the power source 2.

The switching circuit 3 includes a switching component 3a for switching the power source 1 to the power source 2 when the switching signal is input from the processor unit 8. The switching circuit is designed to switch the power source 2 to the power source 1 when there is no input of the switching signal. The switching circuit 3 is preferably one that includes a switching element comprising a metal-oxide semiconductor filed-effect transistor, the switching element being driven with the switching signal from the processor unit 8 to switch the power sources 1 and 2.

The above-described switching circuit 3 may be arranged such that the switching component 3a comprises a bimetallic plate to directly switch according to temperature change without using the switching signal from the processor unit 8.

The switching circuit 3 may also be arranged such that its switch section comprises a centrifugal switch, and the switching circuit switches the power source 1 to the power source 2 when a centrifugal force that is applied to the electronic device with rotation of the tire exceeds a predetermined centrifugal force and keeps a state connected to the power source 1 shown in FIG. 1 when the centrifugal force applied to the electronic device is equal to or below the predetermined centrifugal force, without using the switching signal from the processor unit 8. The switching circuit 3 may further be arranged such that the switch section comprises a speed switch, and the switching circuit switches the power source 1 to the power source 2 when the speed of the vehicle exceeds a predetermined speed and keeps a state connected to the power source 1 shown in FIG. 1 when the vehicle speed is equal to or below the predetermined speed, without using the switching signal from the processor unit 8. Tire temperature increases as vehicle speed increases, and a centrifugal force applied to the electronic device increases as vehicle speed increases; since the tire temperature, vehicle speed and centrifugal force have proportional relationships with each other, the centrifugal switch and speed switch can be used.

According to the present invention described above, since the power sources 1 and 2 comprising chemical batteries having different temperature-dependant discharging characteristics are connected to the electric load 4 via the switching circuit 3, either one of the power sources can stably act even if the tire is in a low temperature range or in a high temperature range, allowing electric power to be stably supplied to the electric load 4 from the power sources.

Figure 4:
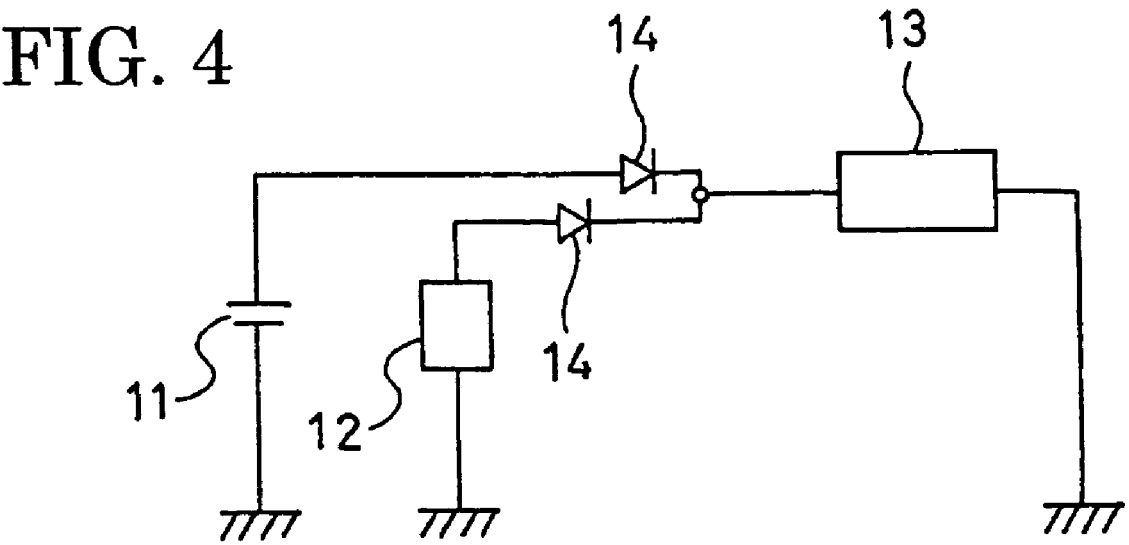
FIG. 4 is an illustration showing a circuit arrangement of another embodiment of a tire-side-mounted electronic device according to the present invention.

Referring to FIG. 4, there is shown another embodiment of a tire-side-mounted electronic device according to the present invention. This tire-side-mounted electronic device has a power source 11 comprising a chemical battery and a power source 12 comprising an electric power generator that generates electric power during running of a vehicle, the power sources 11 and 12 being connected to each other in parallel; an electric load 13 is connected to the power sources 11 and 12 in series. The power sources 11 and 12 is designed to supply electric power to the electric load 13 via a diode 14 serially connected to each of the power sources.

The chemical battery used for the power source 11 may be any chemical battery if it can supply electric power to the electric load 13 during stopping of a vehicle. As the electric power generator constituting the power source 12, a conventionally known one can be used; for example, one employing a piezoelectric device (see Japanese patent application Kokai publication No. 56-124504, for example), one arranged such that electric power is generated across a dielectric coil wound around a stator by a power generation rotor having a permanent magnet (see Japanese patent application Kokai publication No. 2000-278923, for example), and the like can be mentioned.

During stopping of a vehicle, electric power is supplied to the electric load 13 from the power source 11. When the vehicle runs and the voltage of the electric power generator that is the power source 12 is higher than that of the power source 11, the power sources 11 and 12 are switched to supply electric power to the electric load 13 from the power source 12.

By supplying electric power to the electric loads 13 with the power sources 11 and 12 of two types having different discharging characteristics as described above, also, electric power can stably be supplied to the electric load 13, because, when a problem occurs with one of the power sources having discharging characteristics different from the other of the power sources, electric power can be supplied to the electric load 13 from the other.

In the alternative of the electric power generator, a power fuel cell or the like can be used for the above power source 12.

Figure 5:
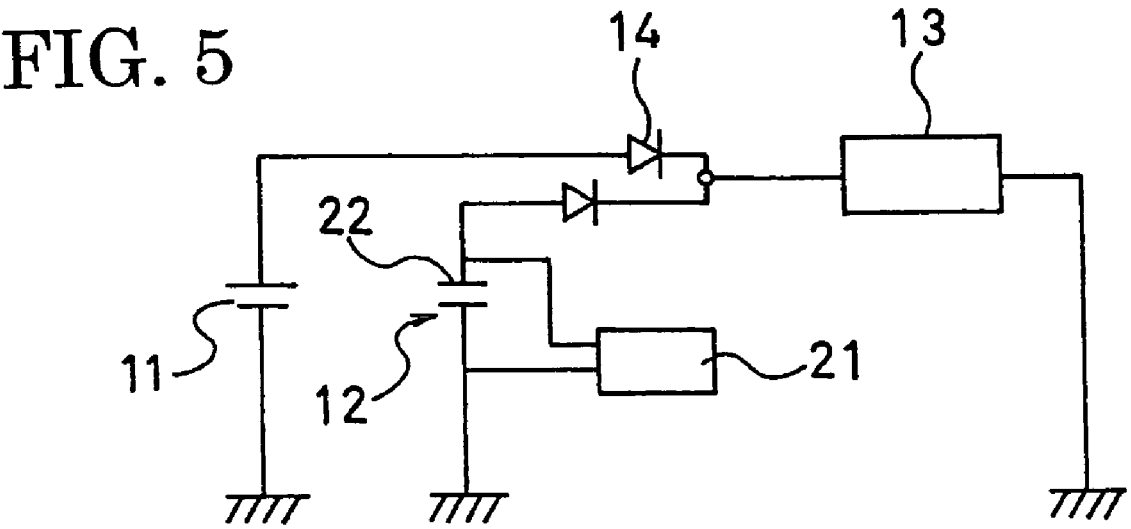
FIG. 5 is an illustration showing a circuit arrangement of still another embodiment of a tire-side-mounted electronic device according to the present invention.

Referring to FIG. 5, there is shown still another embodiment of a tire-side-mounted electronic device according to the present invention. This tire-side-mounted electronic device has the same arrangement as the tire-side-mounted electronic device shown in FIG. 4 except that the power source 12 comprises an electric power generator (charging means) 21 and a capacitor (rechargeable battery) 22 connected thereto in parallel. Electric power that the electric power generator 21 generates during running is stored in the capacitor 22, and electric power is supplied to the electric load 13 from the power source 12 also during stopping of a vehicle when the power source 12 is higher in voltage than the power source 11.

By arranging such that the power source 11 comprise a primary battery, and the power source 12 includes a secondary battery connected to the charging means as described above, also, electric power can stably be supplied, because, when a problem occurs with one of the power sources having discharging characteristics different from the other of the power sources, electric power can be supplied to the electric load 13 from the other.

In the alternative of the electric power generator 21, the power source 12 of FIG. 5 may be one that uses charging means designed to convert an electric wave transmitted to the tire-side-mounted electronic device from a vehicle side to electric power using a dielectric coil.

Each of the tire-side-mounted electronic devices according to the embodiments of FIGS. 4 and 5 may also be arranged such that a switching circuit 3 is connected as shown in FIG. 1 instead of the diodes 14. In this case, the processor unit 8 is designed to output a switching signal when the voltage of the power source 12 exceeds the voltage of the power source 11.

In the above embodiments, there have been explained the tire-side-mounted electronic devices including two types of power sources 1 and 2 (11 and 12) having different discharging characteristics from each other; however, the tire-side-mounted electronic device of the present invention may be one that includes three types or more of power sources having different discharging characteristics from each other; it suffices for the tire-side-mounted electronic device of the present invention to be one that includes at least two types of power sources having different discharging characteristics from each other.

INDUSTRIAL APPLICABILITY

The tire-side-mounted electronic device of the present invention having the aforementioned excellent effect can be very effectively utilized as an electronic device to be mounted on a tire side, such as a tire condition detection device that detects tire air pressure, temperature, etc.

What is claimed is:

1. A tire-side-mounted electronic device comprising:
    at least two types of power sources having different discharging characteristics from each other;
    an electric load connected to the power sources; and
    a switching circuit,
    wherein the at least two types of power sources are connected to the electric load via the switching circuit, and the switching circuit switches between the at least two types of power sources based on one of temperature, tire rotation and vehicle speed.

2. A tire-side-mounted electronic device according to claim 1, wherein the switching circuit includes a switching element comprising a metal-oxide semiconductor filed-effect transistor, and the electric load includes a temperature sensor for detecting tire temperature and a processor unit for driving the switching element according to a detected signal from the temperature sensor to switch the switching circuit.

3. A tire-side-mounted electronic device according to claim 1, wherein the at least two types of power sources comprise batteries having different discharging characteristics.

4. A tire-side-mounted electronic device according to claim 3, wherein the batteries include batteries having different temperature-dependant discharging characteristics.

5. A tire-side-mounted electronic device according to claim 4, wherein the batteries are chemical batteries.

6. A tire-side-mounted electronic device according to claim 5, wherein the chemical batteries include a manganese dioxide cell and a graphite fluoride cell.

7. A tire-side-mounted electronic device according to claim 1, wherein the at least two types of power sources comprise a primary battery and a secondary battery connected to charging means.

8. A tire-side-mounted electronic device according to claim 7, wherein the primary battery is a chemical battery.

9. A tire-side-mounted electronic device according to claim 1, wherein the at least two types of power sources comprise a chemical battery and an electric power generator.

10. A tire-side-mounted electronic device according to claim 1, wherein the tire-side-mounted electronic device is a tire air pressure detection device, and the electric load includes a pressure sensor for detecting tire pressure and a transmitting unit for transmitting a signal detected by the pressure sensor.

* * * * *